(12) United States Patent
Birka et al.

(10) Patent No.: US 11,628,891 B2
(45) Date of Patent: Apr. 18, 2023

(54) PULTRUDED TAILGATE STRUCTURE

(71) Applicant: Magna Exteriors Inc., Concord (CA)

(72) Inventors: Mark P. Birka, Northville, MI (US); Peter G. DeMarois, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 202 days.

(21) Appl. No.: 17/150,166

(22) Filed: Jan. 15, 2021

(65) Prior Publication Data

US 2021/0214023 A1 Jul. 15, 2021

Related U.S. Application Data

(60) Provisional application No. 62/961,370, filed on Jan. 15, 2020.

(51) Int. Cl.
*B62D 33/023* (2006.01)
*B62D 29/04* (2006.01)

(52) U.S. Cl.
CPC ......... *B62D 33/023* (2013.01); *B62D 29/043* (2013.01)

(58) Field of Classification Search
CPC ............................ B62D 33/023; B62D 29/043
See application file for complete search history.

(56) References Cited

U.S. PATENT DOCUMENTS

2018/0304932 A1\* 10/2018 Cooper ................ B62D 25/025
2020/0324831 A1\* 10/2020 DeSimone ........... B62D 29/008

\* cited by examiner

*Primary Examiner* — D Glenn Dayoan
*Assistant Examiner* — Melissa Ann Bonifazi
(74) *Attorney, Agent, or Firm* — Warn Partners, P.C.

(57) ABSTRACT

An automobile panel that are formed using at least partially using a pultrusion forming process. Examples of automobile panels formed using pultrusion include, but are not limited to tail gates, roofs, hatches, doors, hoods, bed liners, floor liners, bed steps, running boards, bumper covers etc. The automobile panel includes a pultruded core panel formed of a polymer resin material having continuous fibers extending across a length of the pultruded core panel, wherein the pultruded core panel has a plurality of channels extending across a surface of the pultruded core panel, wherein the channels have openings at opposing ends of the surface. Also included is an interior finish panel connected to a first side of the pultruded core panel and an exterior finished panel connected to a second side the pultruded core panel.

20 Claims, 6 Drawing Sheets

PULTRUDED TAILGATE STRUCTURE

FIELD OF THE INVENTION

The present invention relates to pultruded tailgate structure.

BACKGROUND OF THE INVENTION

In the automotive field there is a constant need to develop a low cost, high strength, light weight solutions for pickup truck tailgate components and other automotive components. Forming components out of polymers will reduce weight and save time since the forming process can be automated. It is therefore an object of the invention to utilize a pultrusion process to create a core structure that satisfies all customer requirements.

SUMMARY OF THE INVENTION

The present invention is directed to automobile panel formed entirely or partially using a pultrusion forming process. Examples of automobile panels formed using pultrusion include, but are not limited to tail gates, roofs, hatches, doors, hoods, bed liners, floor liners, etc. The automobile panel includes a pultruded core panel formed of a polymer resin material having continuous fibers extending across a length of the pultruded core panel. The pultruded core panel has a plurality of channels extending across a surface of the pultruded core panel, wherein the channels have openings at opposing ends of the surface. In some embodiments the automobile panel further includes an interior finish panel connected to a first side of the pultruded core panel and an exterior finished panel connected to a second side the pultruded core panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Referring now to the Figures generally, a number of automobile panels are shown that have been formed using pultrusion for either a portion of or the entire automobile panel. Examples of automobile panels formed using pultrusion include, but are not limited to tail gates, roofs, hatches, doors, fuel doors, hoods, bed liners, floor liners, etc. In one embodiment of the invention the automobile panel includes a pultruded core panel formed of a polymer resin material having continuous fibers extending across a length of the pultruded core panel, wherein the pultruded core panel has a plurality of channels extending across a surface of the pultruded core panel. The channels have openings at opposing ends of the surface. An interior finish panel connected to a first side of the pultruded core panel and an exterior finished panel connected to a second side the pultruded core panel.

Figure 1:
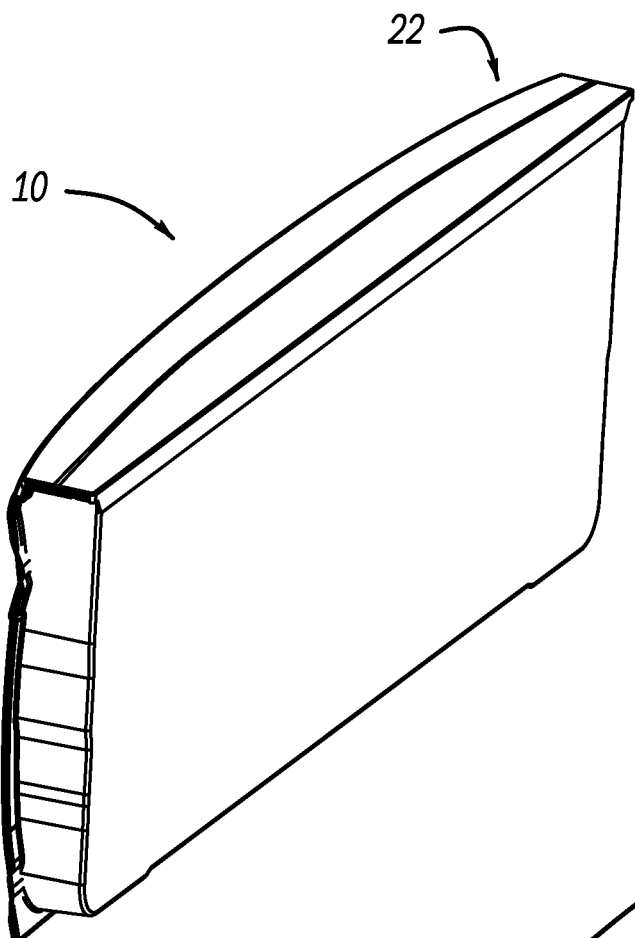
FIG. 1 is a side perspective view of a completed tailgate according to a first embodiment of the present invention.
Figure 2:
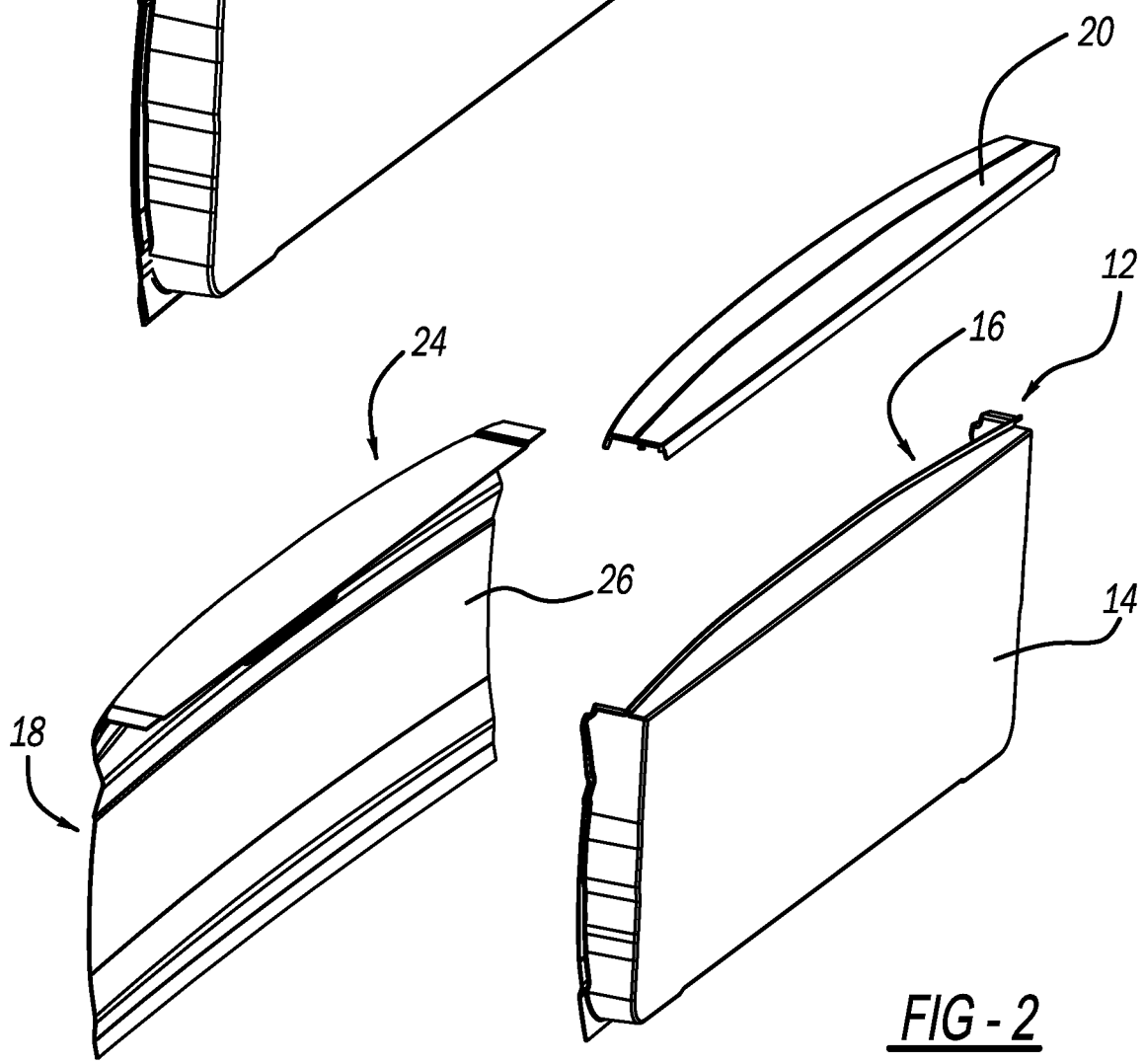
FIG. 2 is an exploded side perspective view of a three piece tailgate according to the first embodiment of the present invention.
Figure 3:
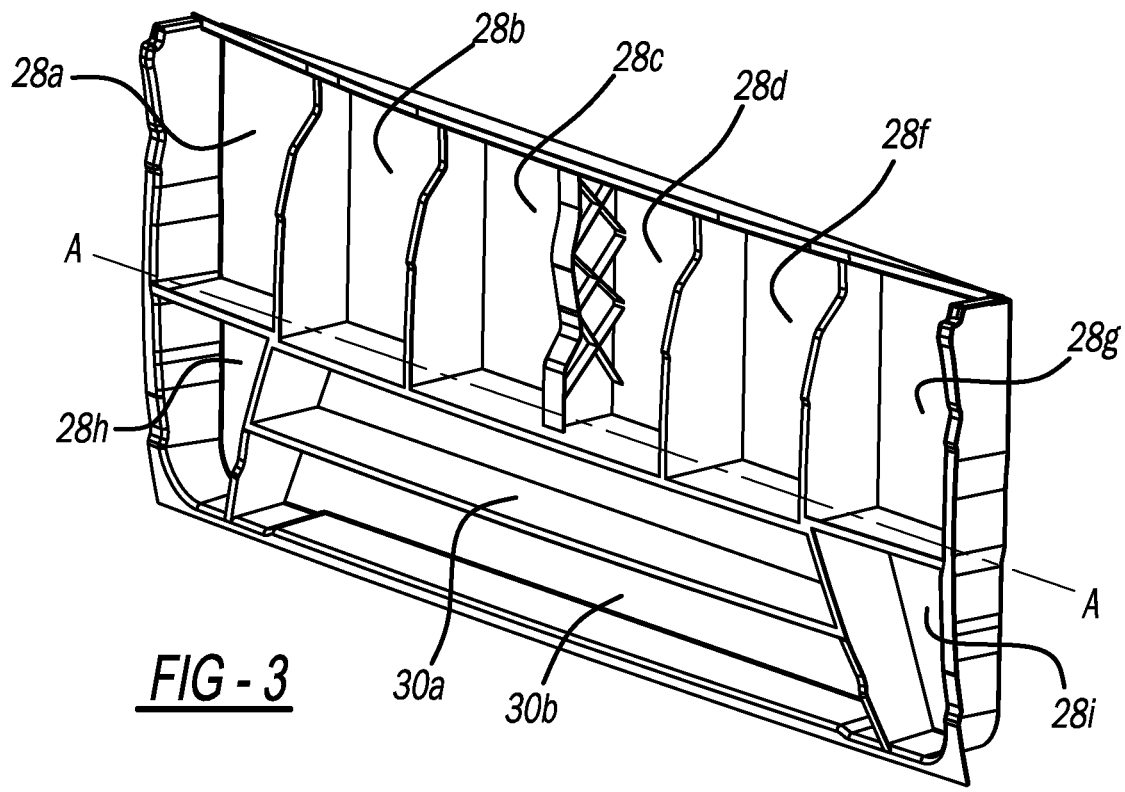
FIG. 3 is a side perspective view of a portion of an injected molded tailgate according to a first embodiment of the invention.

FIGS. 1-3 show an automobile exterior component 10 which is a tailgate for a pickup truck. While a tailgate is shown and described, it is within the scope of this invention of the automobile exterior component in all embodiments of the invention to be different components, such as but not limited to tail gates, roofs, hatches, fuel doors, doors, hoods, bed liners, floor liners, bed steps, running boards, bumper covers etc. The automobile exterior component 10 show in FIGS. 1 and 2 include three pieces, including injection molded core panel 12, an exterior finish panel 18 and a cap 20. The injection molded core panel 12 has an interior finish side 14 and a structural side 16. The exterior finish panel 18 is connected to the injection molded core panel 12 and a cap 20 that connects across a top side 22 of the automobile panel 10 connects between the injection molded core panel 12 and the exterior finish panel to cover joining surface of the injection molded core panel 12 and the exterior finish panel 18 that would otherwise be visible from the top side 22.

The exterior finish panel 18 is formed from injection molding and will be the visible on the automobile exterior, therefore it is painted with a class A finish side 24. The exterior finish panel 18 also includes a connection side 26 that faces the structural side 16 of the injection molded core panel 12. The exterior finish panel 18, the cap 20 and the injection molded core panel 12 are all connected together using various connection mechanisms such as adhesives, fasteners, resistive implant welding or combinations thereof.

The exterior finish panel 18 typically has contour surfaces and will typically be formed by a process other than pultrusion. For example, the exterior finish panel 18 can be formed of stamped metal, injection molding, compression molding or other suitable process. The cap 20 can be formed by pultrusion or by some other process such as being formed of stamped metal, injection molding or compression molding.

Referring now to FIG. 3 of the details of the injection molded core panel 12 are now described. The injection molded core panel 12 differs from other embodiments of the present invention, which use a pultrusion process for forming the core panel 12. In the present embodiment of the invention the injection molded core panel 12 is formed using an injection molding process. As a result, the injection molded core panel 12 has a plurality of laterally extending box channels 28*a*-28*i*. "Laterally extending" is defined herein to mean that the laterally extending box channels 28*a*-28*i* extend generally perpendicular to axis A-A. There is also a plurality of horizontally extending box channels 30*a*, 30*b*. "Horizontally extending" is defined herein to mean that the horizontally extending box channels 30*a*, 30*b* extend generally parallel to axis A-A. The combination of horizontally extending box channels 30*a*, 30*b* and laterally extending box channels 28*a*-28*i* provide different sized pockets withing the automobile panel 10 that provide structural support and strength by forming box structures, in addition to providing regions that can be used for storage, running wires or hoses, mounting latches, hinges, or lights.

Figure 4:
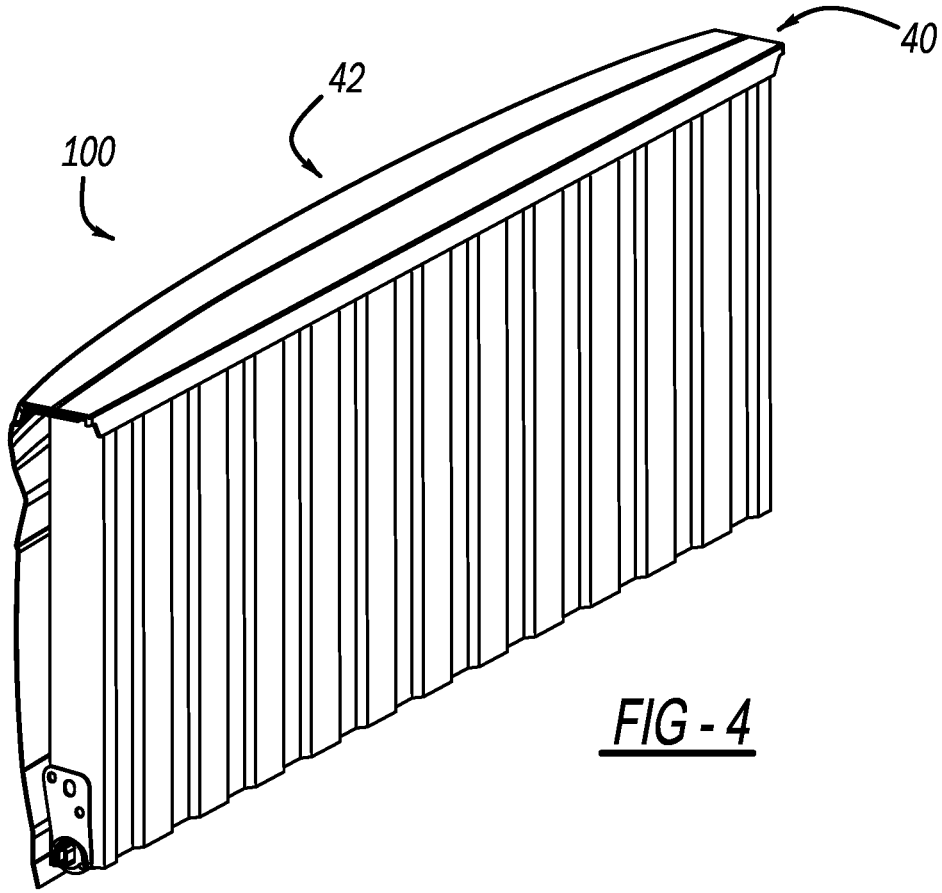
FIG. 4 is a side perspective view of a completed three piece tailgate having a pultruded core having closed channels according to a second embodiment of the invention.
Figure 5:
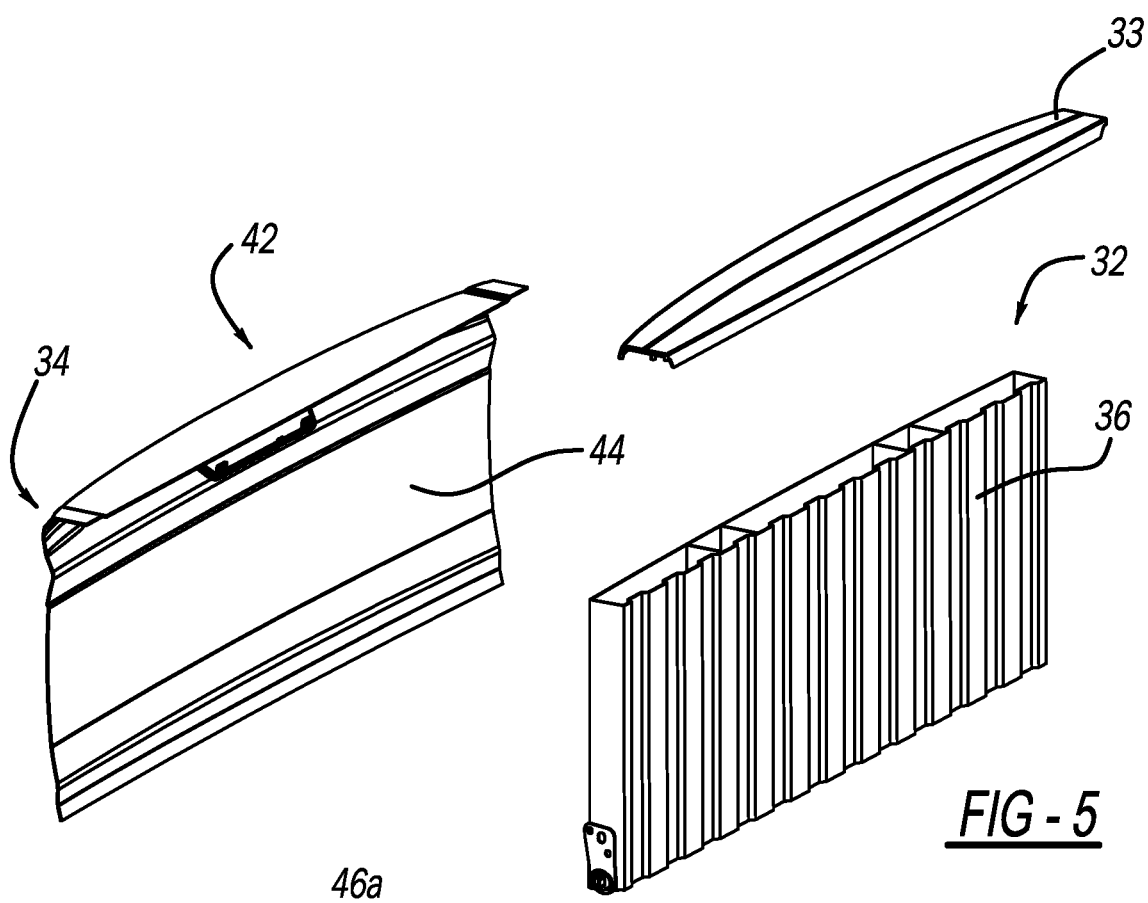
FIG. 5 is an exploded side perspective view of a completed three piece tailgate having a pultruded core panel having closed channels according to the second embodiment of the invention.
Figure 6:
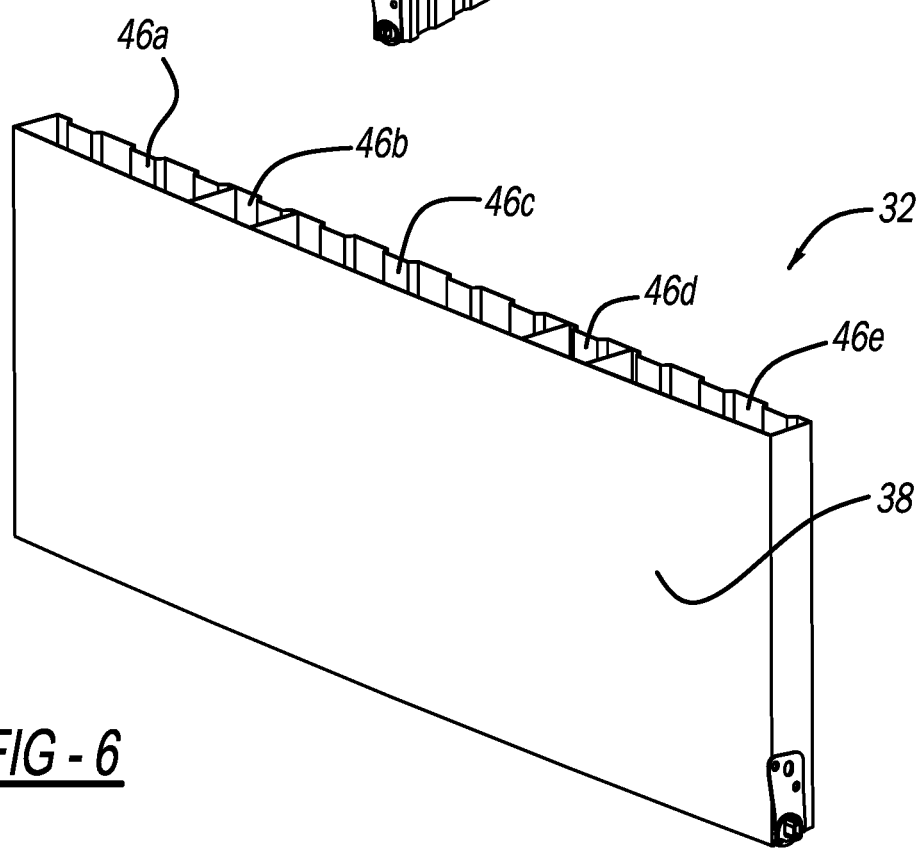
FIG. 6 is a second side perspective view of the pultruded core panel according to a second embodiment of the invention.

FIGS. 4-6 depict a second embodiment of the invention is shown. FIG. 4 in particular shows an automobile exterior component 100, which is a tailgate for a pickup truck. While a tailgate is shown and described, it is within the scope of this invention of the automobile exterior component in all embodiments of the invention to be different components, such as but not limited to tail gates, roofs, hatches, fuel doors, doors, hoods, bed liners, floor liners, bed steps, running boards, bumper covers etc. The automobile exterior component 100 shown in FIGS. 4-6 include three pieces, including a pultruded core panel 32, an exterior finish panel 34 and a cap 33.

The pultruded core panel 32 an interior finish side 36 and a connection side 38. The exterior finish panel 34 is connected to the pultruded core panel 32 and the cap 33 that connects across a top side 40 of the automobile panel 100 and connects between the pultruded core panel 32 and the exterior finish panel 34, to cover joining surfaces of the pultruded core panel 32 and the exterior finish panel 34 that would be visible from the top side 40.

The exterior finish panel 34 is formed from injection molding and will be the visible on the automobile exterior, therefore it is painted with a class A finish side 42. The exterior finish panel 34 also includes a connection side 44 that faces the connection side 38 of the of the pultruded core panel 32. The exterior finish panel 34, the cap 33 and the pultruded core panel 32 are all connected together using various connection mechanisms such as adhesives, fasteners, resistive implant welding or combinations thereof.

The exterior finish panel 34 typically has contour surfaces and is typically formed by a process other than pultrusion. For example, the exterior finish panel 34 according to the present embodiment is optionally formed from stamped metal, injection molding, compression molding or other suitable process. The cap 33 is formed by pultrusion or by some other process such as stamped metal, injection molding, compression molding or other suitable process.

Referring now to FIG. 6 of the details of the pultruded core panel 32 are now described. The pultruded core panel 32 is formed by a pultrusion forming process. The process involves pulling continuous fibers through a molten polymer resin material and pushing the continuous fibers with polymer resin material through a die, where sections are then cut to desired lengths to form the part. In the present case the polymer resin material is one or more of the group including epoxy, urethane, polyester and combinations thereof. The continuous fibers used are glass fibers, carbon fibers and polyparaphenylene terephthalamide. The amount of polymer resin material and continuous fibers can vary depending on a particular application. In one embodiment of the invention the polymer resin material is about 70% and the continuous fibers are about 30%. In other embodiments the fibers are 50%, 60%, 65%, 75%, 80%, with the respective polymer resin material being 50%, 40%, 35%, 25% and 20%.

The pultruded core panel 32 further includes a plurality of channels 46*a*-46*e* that are each enclosed channels that are closed by a portion of the pultruded core panel 32 and extend through the pultruded core panel 32, between openings at each end. The plurality of channels 46*a*-46*e* provide different sized pockets within the automobile panel 100 that provide structural support and strength by forming box structures in addition to providing regions that can be used as storage areas, running wires or hoses, mounting latches, hinges, or lights.

Figure 7:
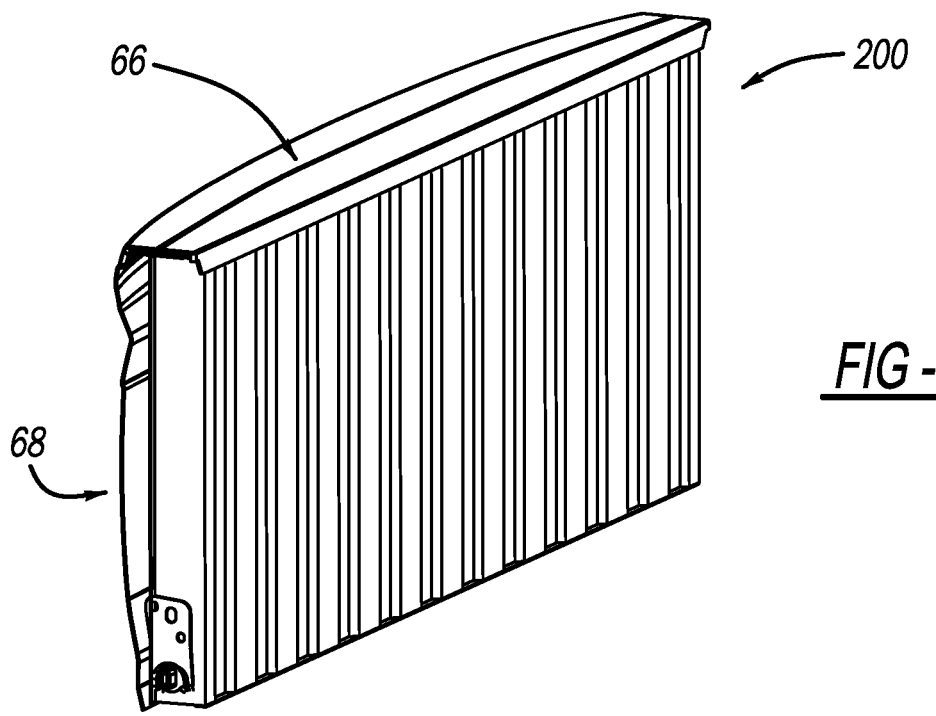
FIG. 7 is a side perspective view of a completed four piece tailgate according to a third embodiment of the invention.
Figure 8:
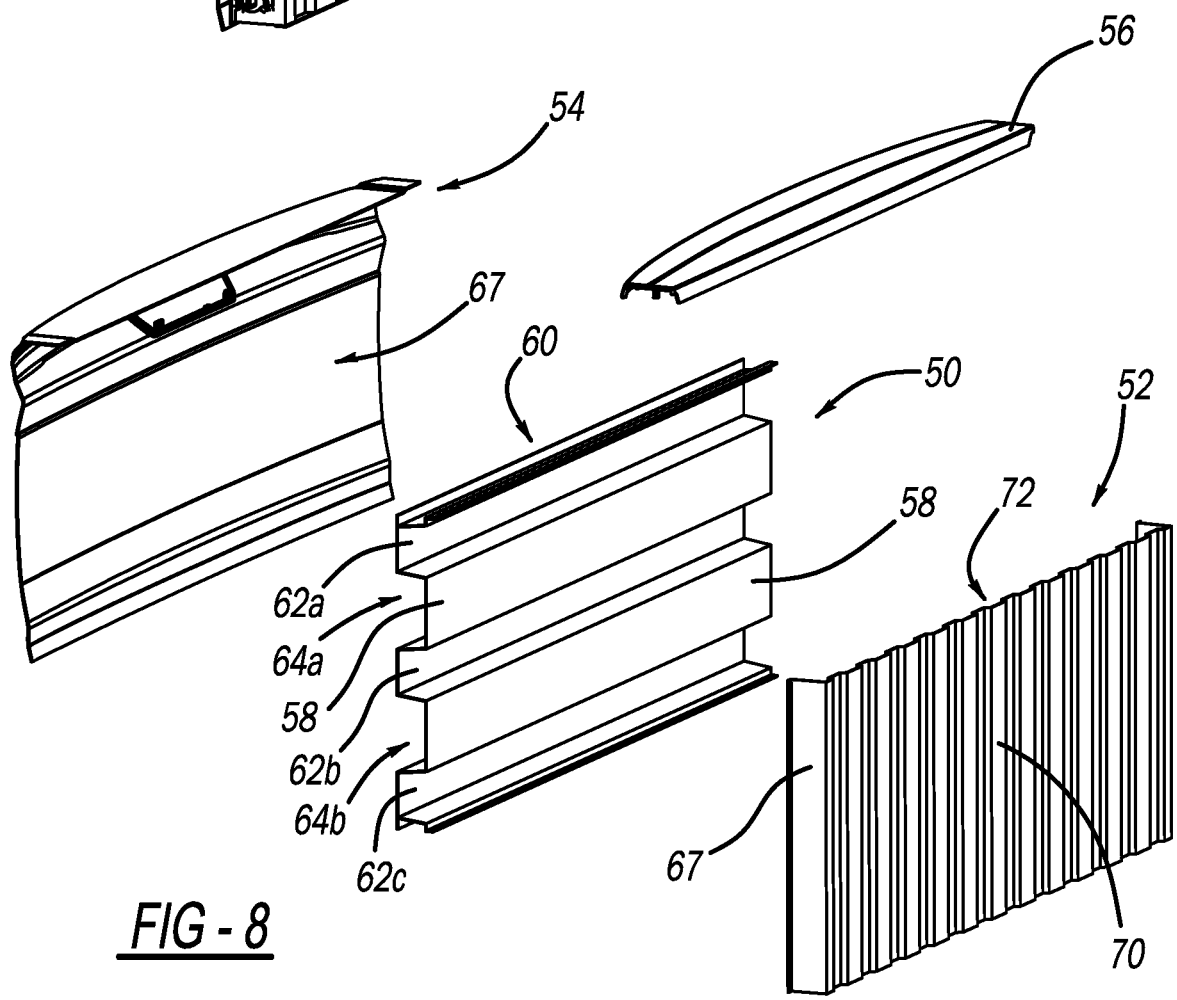
FIG. 8 is an exploded side perspective view of a completed four piece tailgate according to a third embodiment of the invention.

Referring now to FIGS. 7-8 a third embodiment of the invention is shown. FIG. 7 in particular shows an automobile exterior component 200, which is a tailgate for a pickup truck. While a tailgate is shown and described, it is within the scope of this invention of the automobile exterior component in all embodiments of the invention to be different components, such as but not limited to tailgates, roofs, hatches, fuel doors, doors, hoods, bed liners, floor liners, bed steps, running boards, bumper covers etc. The automobile exterior component 200 shown in FIGS. 7-8 include four pieces, including a pultruded core panel 50, a pultruded interior finish panel 52, an exterior finish panel 54 and a cap 56.

The pultruded core panel 50 includes an interior side 58 and an exterior side 60, where the interior side 58 faces and is connected with the pultruded interior finish panel 52 and the exterior side 60 faces and is connected with the exterior finish panel 54. The interior side 58 has a plurality of open ended channels 62*a*, 62*b*, 62*c* and the exterior side 60 has a plurality of open ended channels 64*a*, 64*b*. The cap 56 connects across a top side 66 of the automobile panel 200 and connects between the pultruded core panel 50 and the exterior finish panel 54 to cover joining surfaces of the pultruded core panel 50 and the exterior finish panel 54 that would be visible from the top side 66.

The exterior finish panel 54 is formed from injection molding and will be the visible on the automobile exterior, therefore the exterior finish panel 54 has a painted side 68 that has a class A finish. The exterior finish panel 54 also includes a connection side 67 that faces the exterior side 60 of the of the pultruded core panel 50. The exterior finish panel 54, the cap 56 and the pultruded core panel 50 are all connected together using various connection mechanisms such as adhesives, fasteners, resistive implant welding or combinations thereof.

The exterior finish panel 54 typically has contour surfaces and therefore typically be formed by a process other than pultrusion. The exterior finish panel 54 can be formed of stamped metal, injection molding, compression molding or other suitable process. The cap 56 can be formed by pultrusion or by some other process such as being formed of stamped metal, injection molding, compression molding or other suitable process.

Referring now to FIG. 8 of the details of the pultruded core panel 50 are now described. The pultruded core panel 50 is formed by a pultrusion forming process. The process involves pulling continuous fibers through a molten polymer resin material and pushing the continuous fibers with polymer resin material through a die, where sections are then cut to desired lengths to form the part. In the present case the polymer resin material is one or more of the group including epoxy, urethane, polyester and combinations thereof. The continuous fibers used are glass fibers, carbon fibers and polyparaphenylene terephthalamide. The amount of polymer resin material and continuous fibers can vary depending on a particular application. In one embodiment of the invention the polymer resin material is about 70% and the continuous fibers are about 30%. In other embodiments the fibers are 50%, 60%, 65%, 75%, 80%, with the respective polymer resin material being 50%, 40%, 35%, 25% and 20%.

The plurality of open ended channels 64a, 64b on the exterior side 60 of the pultruded core panel 50 are each closed by a portion of the connection side 67 of the pultruded interior finish panel 52, when the automobile exterior component 200 is assembled. The plurality of open ended channels 62a, 62b, 62c on the interior side 58 of the pultruded core panel 50 are also each closed by the connection side 67 of the pultruded interior finish panel 52, when the automobile exterior component 200 is assembled. The pultruded interior finish panel 52 has an interior side 70 having vertically extending channels and connection side 72 having vertically extending channels. The channels on the connection side 72 extend at an angle that is generally perpendicular to the plurality of open ended channels 62a, 62b, 62c, however, it is within the scope this invention for the channels on the connection side or the plurality of open ended channels 62a, 62b, 62c to extend parallel to each other or at an angle to each other.

Figure 9:
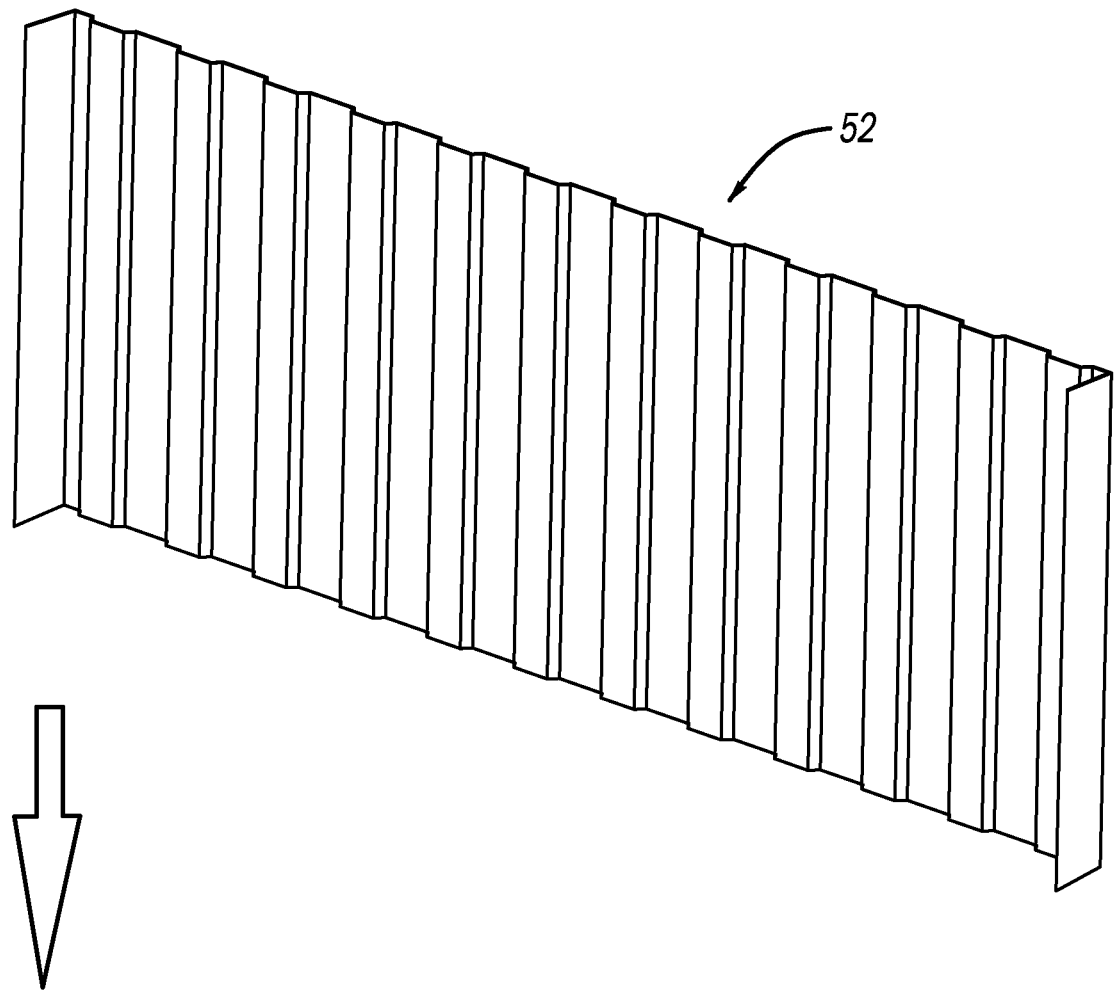
FIG. 9 schematically depicts a method of performing a Y-direction pultrusion of a pultruded core panel having closed channels according to another embodiment of the invention.
Figure 10:
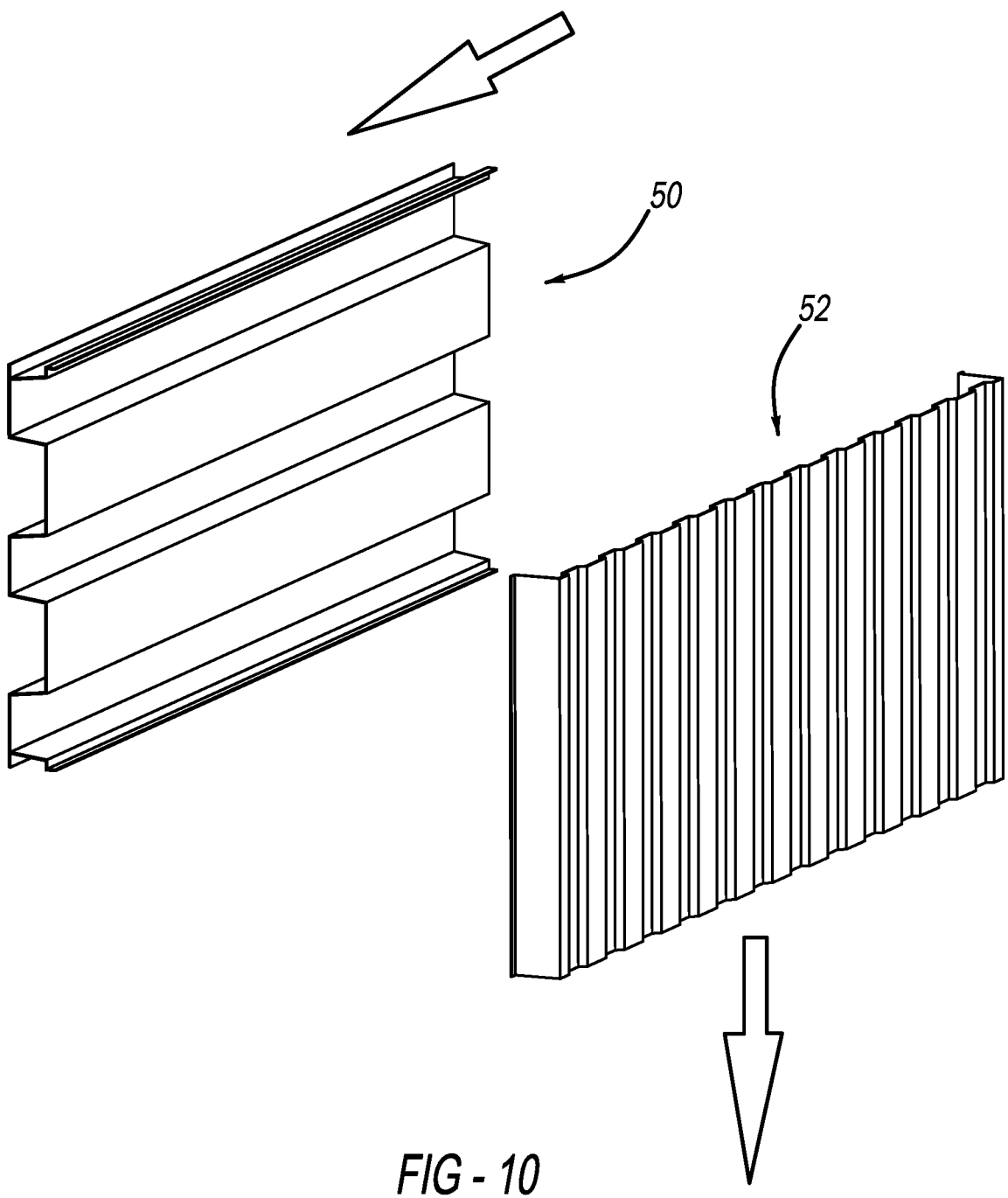
FIG. 10 schematically depicts a method of performing a Z-direction pultrusion of a pultruded core panel and a Y-direction pultrusion of the pultruded interior finish panel to another embodiment of the invention.

Referring now to FIGS. 9-10 schematically shown is a pultrusion method of making portions of the automobile exterior component 100, 200 shown in FIGS. 1-8. The pultrusion method is performed by taking the continuous fiber materials and passing them through a bath of molten resin. The continuous fibers with molten resin are then pressed through a tool that shapes the product. The pultrusion process occurs by pulling different components in different directions. For example, in FIG. 10 the pultruded core panel 50 and pultruded interior finish panel 52 are pull through a tools in different direction that are perpendicular. As shown the pultruded core panel 50 is pulled though the pultrusion process in the "Z" direction, while the pultruded interior finish panel 52 is pulled in the "Y" direction; thereby creating channels that are perpendicular to each other.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automobile panel comprising:
    a pultruded core panel formed of a polymer resin material having continuous fibers extending across a length of the pultruded core panel, wherein the pultruded core panel has a plurality of channels extending across a surface of the pultruded core panel, wherein the plurality of channels have openings at opposing ends of the surface;
    a pultruded finish panel connected to a first side of the pultruded core panel, wherein the pultruded finish panel is formed of a polymer resin material having continuous fibers extending across a length of the pultruded finish panel, wherein the pultruded finish panel has a plurality of channels extending across a surface of the pultruded finish panel, where the channels have openings at opposing ends of the surface of the pultruded finish panel; and
    an exterior finished panel connected to a second side the pultruded core panel.

2. The automobile panel of claim 1 wherein the plurality of channels of the pultruded finish panel extends at an angle that is about perpendicular to the plurality of channels of the pultruded core panel.

3. The automobile panel of claim 1 wherein the plurality of channels of the pultruded finish panel extends at an angle that is about parallel to the plurality of channels of the pultruded core panel.

4. An automobile panel comprising:
    a pultruded core panel formed of a polymer resin material having continuous fibers extending across a length of the pultruded core panel, wherein the pultruded core panel has a plurality of channels extending across a surface of the pultruded core panel, wherein the plurality of channels have openings at opposing ends of the surface;
    an interior finish panel connected to a first side of the pultruded core panel;
    an exterior finished panel connected to a second side the pultruded core panel, and
    a cap extending across a third side of the pultruded core panel and spanning between the interior finish panel and the exterior finished panel.

5. An automobile panel comprising:
    a pultruded core panel formed of a polymer resin material having continuous fibers extending across a length of the pultruded core panel, wherein the pultruded core panel has a plurality of channels extending across a surface of the pultruded core panel, wherein the plurality of channels have openings at opposing ends of the surface;
    an interior finish panel connected to a first side of the pultruded core panel;
    an exterior finished panel connected to a second side the pultruded core panel, and
    wherein the plurality of channels are open channels such that they are open to one of the interior finished panel and exterior finished panel on at least one side.

6. An automobile panel comprising:
    a pultruded core panel formed of a polymer resin material having continuous fibers extending across a length of the pultruded core panel, wherein the pultruded core panel has a plurality of channels extending across a surface of the pultruded core panel, wherein the plurality of channels have openings at opposing ends of the surface;
    an interior finish panel connected to a first side of the pultruded core panel;
    an exterior finished panel connected to a second side the pultruded core panel, and
    wherein the plurality of channels are enclosed channels that are each closed by a portion of the pultruded core on all sides.

7. The automobile panel of claim 1 wherein the polymer resin material having continuous fibers includes about 30% fibers and about 70% polymer resin material.

8. The automobile panel of claim 4 wherein the continuous fibers are one selected from the group consisting of glass fibers, carbon fibers and polyparaphenylene terephthalamide.

9. The automobile panel of claim 1 wherein one or more of the group comprising latches, lock mechanisms, wires, lights, and fluid hoses are each connected to a surface of the pultruded core panel at a location in at least one of the plurality of channels of the pultruded core panel.

10. The automobile panel of claim 1 wherein the automobile panel is a tail gate for an automobile.

11. An automobile panel comprising:
a pultruded core panel having a plurality of open ended channels extending across the entire surface of the pultruded core panel;
an pultruded finish panel connected to a first side of the pultruded core panel, wherein the pultruded finish panel is formed of a polymer resin material having continuous fibers extending across a length of the pultruded finish panel, wherein the pultruded finish panel has a plurality of channels extending across a surface of the pultruded finish panel, where the channels have openings at opposing ends of the surface of the pultruded finish panel; and
an exterior finished panel connected to the pultruded core panel.

12. The automobile panel of claim 11 wherein the plurality of channels of the pultruded finish panel extends at an angle that is about perpendicular to the plurality of channels of the pultruded core panel.

13. The automobile panel of claim 11 wherein the plurality of channels of the pultruded finish panel extends at an angle that is about parallel to the plurality of channels of the pultruded core panel.

14. An automobile panel comprising:
a pultruded core panel having a plurality of open ended channels extending across the entire surface of the pultruded core panel;
an interior finish panel connected to a first side of the pultruded core panel;
an exterior finished panel connected to the pultruded core panel, and
a cap extending across a third side of the pultruded core panel and spanning between the interior finish panel and the exterior finished panel.

15. An automobile panel comprising:
a pultruded core panel having a plurality of open ended channels extending across the entire surface of the pultruded core panel;
an interior finish panel connected to a first side of the pultruded core panel;
an exterior finished panel connected to the pultruded core panel, and
wherein the plurality of channels are open channels such that they are open to one of the interior finished panel and exterior finished panel on at least one side.

16. The automobile panel of claim 11 wherein the plurality of channels are enclosed channels that are each closed by a portion of the pultruded core on all sides.

17. The automobile panel of claim 11 wherein the pultruded core panel is formed of a polymer resin material having continuous fibers extending through the polymer resin material.

18. The automobile panel of claim 17 wherein the continuous fibers are one selected from the group consisting of glass fibers, carbon fibers and polyparaphenylene terephthalamide.

19. The automobile panel of claim 11 wherein one or more of the group comprising latches, lock mechanisms, wires, lights, and fluid hoses are each connected to a surface of the pultruded core panel at a location in at least one of the plurality of channels of the pultruded core.

20. The automobile panel of claim 11 wherein the automobile panel is a tail gate for an automobile.

* * * * *